US008269765B2

(12) United States Patent
Maillot (10) Patent No.: US 8,269,765 B2
(45) Date of Patent: Sep. 18, 2012

(54) SYSTEM AND METHOD FOR REMOVING SEAM ARTIFACTS

(75) Inventor: Jerome Maillot, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 1206 days.

(21) Appl. No.: 12/039,673

(22) Filed: Feb. 28, 2008

(65) Prior Publication Data

US 2009/0219280 A1 Sep. 3, 2009

(51) Int. Cl.
*G06T 15/00* (2011.01)

(52) U.S. Cl. ........ 345/419; 345/420; 345/427; 345/441; 345/582; 345/583; 382/131; 382/159; 382/284

(58) Field of Classification Search .................. 345/419, 345/420, 427, 441, 582, 583; 382/131, 159, 382/284

See application file for complete search history.

(56) References Cited

U.S. PATENT DOCUMENTS

| | | | | |
|---|---|---|---|---|
| 6,018,349 A * | 1/2000 | Szeliski et al. | ................ | 345/629 |
| 6,853,373 B2 * | 2/2005 | Williams et al. | .............. | 345/419 |
| 7,199,793 B2 * | 4/2007 | Oh et al. | ........................ | 345/419 |
| 7,236,167 B2 * | 6/2007 | Lee et al. | ....................... | 345/420 |
| 7,499,586 B2 * | 3/2009 | Agarwala et al. | ............ | 382/154 |
| 7,755,623 B2 * | 7/2010 | Rockwood et al. | ........... | 345/420 |
| 7,800,627 B2 * | 9/2010 | Zhou et al. | .................... | 345/582 |
| 2006/0244757 A1 * | 11/2006 | Fang et al. | .................... | 345/582 |
| 2009/0219300 A1 * | 9/2009 | Peleg et al. | ................... | 345/630 |
| 2011/0211771 A1 * | 9/2011 | Rubenstein et al. | ......... | 382/299 |

OTHER PUBLICATIONS

Banninga "UV Mapping Tips and Tricks", Mar. 25, 2004.*
Banninga "UVMapping Tips and Tricks", Mar. 25, 2004 (Front page).*
Avidan: "Seam Carving for Content-Aware Image Resizing". ACM 2007.*
Rubinstein et al. "Improved Seam Carving for Video Retargeting". ACM 2008.*
Gingold et al. "A Direct Texture Placement and Editing Interface", Published 2006.*
Lempitsky et al. "Seamless Mosaicing of Image-Based Texture Maps", IEEE 2007.*
"Convert to File Texture," Autodesk Maya 2008 documentation, Sep. 2007.

* cited by examiner

*Primary Examiner* — Kimbinh T Nguyen
(74) *Attorney, Agent, or Firm* — Patterson & Sheridan, LLP (57) ABSTRACT

Embodiments of the present invention include techniques for reducing artifacts in rendered images. In one embodiment, a dual UV engine generates a dual of the graph defined by an initial UV set associated with a 3D model. The dual UV engine then uses existing flattening and layout engines to generate a dual UV set from this dual graph. Using the dual graph to define the dual UV set ensures that the seams corresponding to the initial UV set and the dual UV set minimally intersect.

35 Claims, 8 Drawing Sheets

SYSTEM AND METHOD FOR REMOVING SEAM ARTIFACTS

BACKGROUND OF THE INVENTION

1. Field of the Invention

The present invention generally relates to graphics processing, and more specifically, to a system and method for removing seam artifacts when rendering a graphics image depicting a three-dimensional (3D) object using component pieces of a two-dimensional (2D) UV parameterization of a texture map.

2. Description of the Related Art

A broad variety of computer-based applications support graphical 3D models of real or imaginary objects. For example, computer aided design (CAD) applications are commonly used to compose 3D models representing real-world constructs that are related to construction projects, such as a house or a terrain surface. Similarly, computer game applications may use 3D models of imaginary constructs, such as fictitious characters, to allow users to visually interact with the constructs in a realistic fashion. Once composed, 3D models are often used to generate two-dimensional (2D) images for display purposes in a process known as graphics rendering.

One task that may be performed during graphics rendering is texture mapping. As is well-known, texture mapping is a method for adding simulated visual details, such as surface irregularities and color, to 3D models. Although such details may be modeled as values attached to the vertices of geometries in a 3D model of a given object, such a model would be very complex and time-consuming to process and display. To address this issue, the object may instead be modeled using simpler geometries to convey the overall shape of the object, and visual details may be captured as textures. Texture mapping techniques use such textures in conjunction with the geometries of the object to simulate additional visual details, thereby improving the realism of the displayed image of the object. For example, a texture representing an off-white, dimpled surface may be applied to a geometric sphere during rendering in order to display a realistic image of a golf ball.

Textures are typically defined in a 2D coordinate system known as texture space and conventionally denoted as a (u, v) coordinate system. Similarly, geometries representing an object are typically defined using a 3D coordinate system known as object space and denoted using (x, y, z) coordinates. Since textures are defined in 2D texture space but represent the visual details of objects that are defined in 3D object space, a process known as UV mapping is often used to create a flattened representation in texture space of the 3D model in object space. During UV mapping, various vertices in a surface mesh of a 3D model are chosen to define a relationship between object space and texture space. Flattening tools cut and unfold the surface mesh along the edges connecting the chosen vertices, layout tools arrange the resulting pieces in texture space, and the UV coordinates of each of the chosen vertices are set to the corresponding location in texture space. Each of the pieces in texture space is known as a UV piece and, collectively, the UV pieces are referred to as a UV set. Finally, textures that include simulated visual details, such as color and surface roughness, are linked to the UV set (i.e., the data in the texture is associated with the UV set). Unfortunately, when the object is rendered for display purposes and the UV set is applied to the surface of the 3D model, artifacts are often visually apparent along the seams where the edges of the UV pieces abut. These seam artifacts break the visual continuity of the image and detract from the realism of the rendered image.

One approach to reducing the seam artifacts is to paint onto textures that are linked to a UV set using a technique known as texel overscanning. In this approach, the painting tool is used to paint visual details onto overscan texels that abut the boundary texels of the UV pieces in texture space. These overscan texels are blended with the boundary texels to reduce seam artifacts. While overscanning can improve the quality of the rendered image, some seam artifacts may still be visually apparent. For example, pixels in the rendered image may exhibit interference between two pieces of the object represented by elongated triangles that were meant to be unconnected, but whose texels were blended together during overscanning. In addition, the colors used to paint the overscan texels are not necessarily well defined.

As the foregoing illustrates, what is needed in the art is a more effective technique for removing seam artifacts when using a UV set to render a 3D graphics image.

SUMMARY OF THE INVENTION

Embodiments of the present invention include techniques for reducing artifacts in rendered images. One embodiment of the invention includes a method for reducing seams in an image of a 3D model rendered using a texture. The method may generally include receiving a first UV set associated with the 3D model, wherein the first UV set includes one or more UV pieces defining a first two-dimensional (2D) representation of the 3D model. A second UV set is then computed from the first UV set, where the second UV set includes one or more UV pieces defining a second 2D flattened representation of the 3D model. The second UV set may be computed such that seams of first UV set and seams of the second UV set are distinct from one another when applied to the 3D model. That is, the seams do not overlap, but may intersect with one another. When rendering an image of the 3D model, the first UV set and the second UV set may be applied to the 3D model during a rendering operation to generate a rendered 2D image of the 3D model.

In an alternative embodiment, the UV pieces of the first UV set are enlarged to create overlapping regions for adjacent UV pieces. One such embodiment includes for reducing seams in an image generated when applying a texture to a 3D model. The method may include receiving a first UV set associated with the 3D model. The first UV set includes one or more UV pieces providing a first two-dimensional 2D flattened representation of the 3D model. The method may also include generating an augmented UV set, wherein generating the augmented UV set includes expanding at least a first UV piece included in the first UV set to create an augmented UV piece. The augmented UV piece may overlap a seam on the 3D model abutting the first UV piece and an adjacent UV piece. When rendering an image of the 3D model, the augmented UV set may be applied to the 3D model to generate a rendered 2D image of the 3D model without seam artifacts.

During rendering, shader programs executing in a graphics rendering pipeline may be configured to fetch samples from both the initial UV set and the second UV set, weight these samples by the distance from the seams, and blend and interpolate the samples to minimize any artifacts. For example, the second UV set may be computed as the mathematical dual of the first UV set. Such an approach leads to a second UV set (i.e., the dual) where the seams of the two UV sets minimally intersect. Advantageously, since the seams corresponding to the two UV sets minimally intersect, seam artifacts may be dramatically reduced compared to using a single UV set.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a rendering technique where multiple overlapping UV sets are used to improve the visual quality of a texture rendered on a surface. In one embodiment, one or more UV sets are automatically computed from a first UV set, where the seams of the first UV set fall within the interior of a least one of the UV pieces included in the generated UV sets. That is, the seams of the UV sets do not overlap with one another, although the seams may intersect at single points. For example, the second UV set may be computed from a dual graph representation generated from the first UV set. In an alternative embodiment, UV pieces in the first UV set may be augmented by "growing" UV regions from the "corners" of the seams of the first UV set.

During a painting process used to generate a texture map, for each triangle (or pixel), it may be determined which UV piece(s) within the UV set(s) contribute to painting that triangle (or pixel). Furthermore, each contribution can be weighted by the distance from the encompassing texture seams. In this manner, painting is done using texture data that is not distorted by seams. Further, the result may be transferred to one or more UV pieces within one or more UV sets, as appropriate. For example, both blurring and smearing are painting processes that may use multiple UV sets to reduce the most visible seam artifacts. During a blurring process, a painting engine may efficiently blur above the UV seams of one UV set using another UV set. More specifically, a painting engine may dynamically select the UV set that contains the fewest seams (typically zero) under the position of the brush. Similarly, during a smearing process, the painting engine reads the values corresponding to the pixels from the UV set that contains the fewest seams under the current position of the brush and, subsequently, uses these values to paint the next position of the brush.

During rendering, if a conventional rendering engine is used, then each UV set may be used to independently render the image, and the resulting images may be blended together to form a final image. Alternatively, the rendering engine may blend contributions from all of the applicable UV pieces in all of the UV sets to determine a single color for each pixel. Further, shading engines in a graphics pipeline may be configured to assign a weight to each of the texture samples based on the distance of the texture sample from any seams. That is, texture samples near a seam may contribute less to the ultimate color assigned to a pixel in a rendered image. Thus, rendering quality is improved as the rendered images lack artifacts resulting from seams in the UV set.

Figure 1:
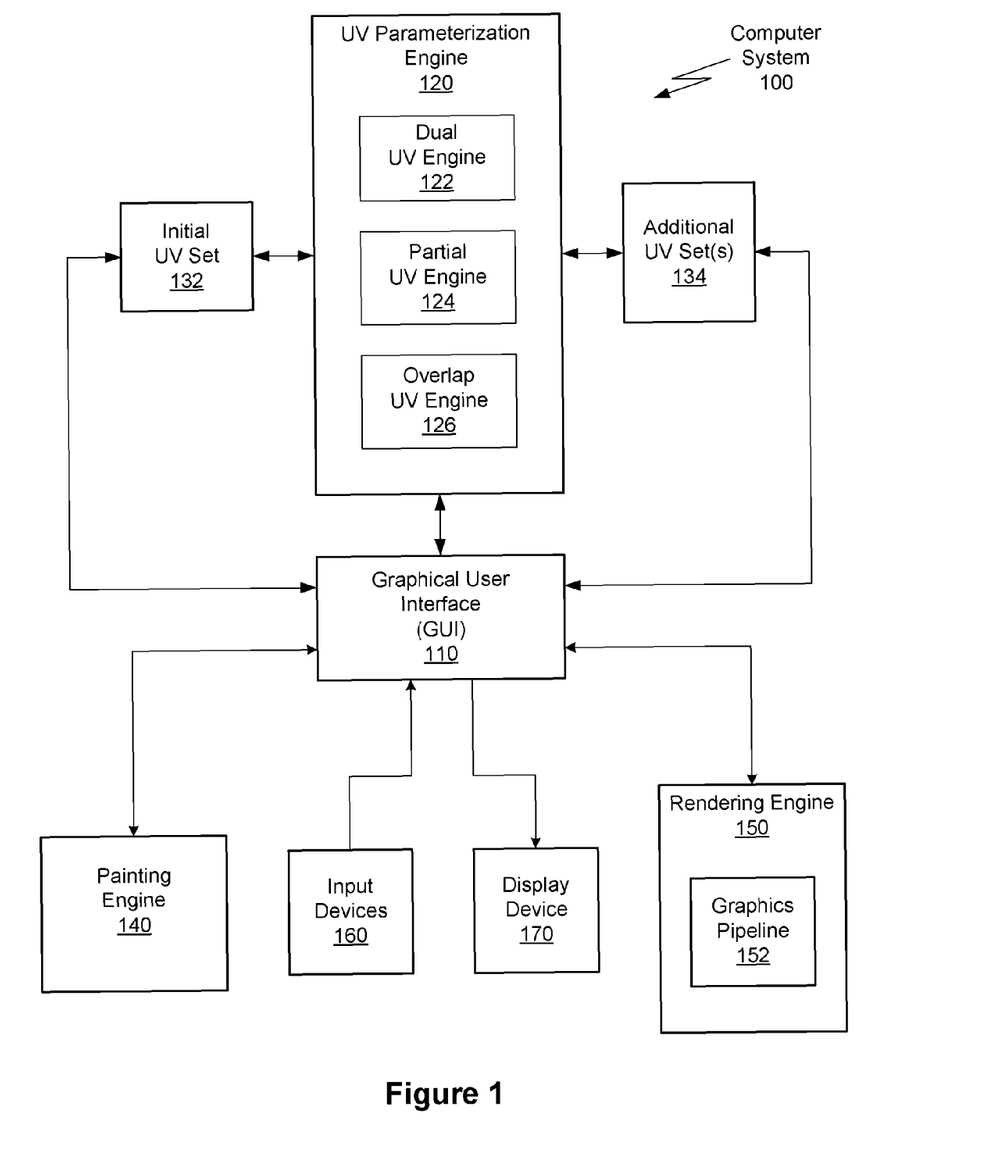
FIG. 1 is a conceptual illustration of a computer system in which one or more embodiments of the invention may be implemented.

FIG. 1 is a conceptual illustration of a computer system 100 in which embodiments of the invention may be implemented. In one embodiment, the computer system 100 is configured to access an initial UV set 132 that covers the surface of a 3D model, use the initial UV set 132 to generate zero or more additional UV sets 134, augment existing UV sets, and use all of the UV sets to render the 3D model. The UV sets minimize visible rendering artifacts when the UV sets are used to render an image of a 3D model. In one embodiment, the components illustrated in computer system 100 include computer software applications executing on existing computer systems, e.g., desktop computers, server computers, laptop computers, tablet computers, and the like. The software applications described herein, however, are not limited to any particular computer system and may be adapted to take advantage of new computer systems as they become available.

Additionally, the components illustrated in the computer system 100 may be software applications executing on distributed systems communicating over computer networks including local area networks or large, wide area networks, such as the Internet. For example, a graphical user interface (GUI) 110 may include a software program executing on a client computer system communicating with a UV parameterization engine 120, a painting engine 140, and a rendering engine 150. Also, in one embodiment, the graphical user interface 110, the UV parameterization engine 120, the painting engine 140, and the rendering engine 150 may be provided as an application program (or programs) stored on computer readable media such as a CD-ROM, DVD-ROM, flash memory module, or other tangible storage media.

As shown, the computer system 100 includes the painting engine 140, the rendering engine 150, the UV parameterization engine 120, the graphical user interface 110, input devices 160, an initial UV set 132, one or more additional UV sets 134, and a display device 170.

The painting engine 140 is representative of software applications used to create and modify textures in 3D object spaces, and/or 2D texture space. Also as shown, the rendering engine 150 includes a programmable graphics pipeline 152 that transforms 3D scenes that include any number of 3D models into 2D images for display purposes. As is well known, the graphics pipeline 152 may include one or more programmable shaders that are configured to apply UV sets to 3D models to produce a final color for each pixel in a rendered 2D image.

The UV parameterization engine 120 may be configured to allow users interacting with the graphical user interface 110 via the input devices 160 to specify an initial UV set 132 and, subsequently generate additional UV sets 134 as well as augment existing UV sets. The graphical user interface 110 may be used to display the initial UV set 132 and the additional UV sets 134 on the display device 170.

Each of the initial UV set 132 and the additional UV sets 134 may provide a flattened (i.e., 2D) representation of the surface of the 3D model. More specifically, each of the UV sets includes one or more pieces generally referred to as UV pieces. Each UV piece represents a flattened portion of the surface of the 3D model. Further, each of the UV sets may be linked to textures that add simulated visual details, such as color and surface roughness, to the 3D model. When the object is rendered for display purposes, if the initial UV set is applied to the surface of the 3D model, then artifacts are often visually apparent along the seams where the edges of the UV pieces in the initial UV set abut one another. In one embodiment, however, the additional UV sets 134 are applied to the surface of the 3D model, then these seams are hidden and, consequently, the seam artifacts are reduced or removed entirely. In alternate embodiments, the user may manually edit any of the additional UV sets that are generated by the UV parameterization engine. The user may make these manual edits in any technically feasible fashion (e.g., using an interactive tool, using a processing tool, etc.). Further, the UV parameterization engine may be configured to allow the user to register one or more manually-created additional UV sets.

The UV parameterization engine 120 is configured to create the additional UV sets 134 and/or augment an existing UV sets. As shown, the UV parameterization engine 120 includes a dual UV engine 122, a partial UV engine 124, and an overlap UV engine 126. After the user loads an initial UV set 132 into the UV parameterization engine 120, the user may select various options that invoke one or more of the dual UV engine 122, the partial UV engine 124, and the overlap UV engine 126, in any combination and in any order. The dual UV engine 122 and the partial UV engine 124 are configured to generate additional UV sets 134. The overlap UV engine 126 is configured to augment an existing UV set, such as the initial UV set 132.

In one embodiment, the dual UV engine 122 may be configured to create a dual UV set from a primary UV set. Typically, the primary UV set is the initial UV set 132. To create the dual UV set, the dual UV engine 122 first determines a UV graph that corresponds to a primary UV set. Each of the vertices in the primary UV graph includes UV coordinates that link object space to texture space, thereby defining a UV mapping. The edges that connect each of these vertices correspond to edges of one or more UV pieces in the primary UV set and, consequently, seams. The primary UV graph preserves the skeleton (i.e., the vertices and faces) of the primary UV set, but does not contain texture or geometry information within this skeleton. The dual UV engine 122 then generates the dual UV graph that corresponds to the primary UV graph. As is known by persons skilled in the art, the dual graph of a given graph includes a vertex for each region in the given graph and a region for each vertex in the given graph. The dual UV engine may generate the dual UV graph using a dual operation implemented in any technically feasible fashion, such as using geometric dual methods or combinatorial dual methods. The edges of the dual UV graph are defined by the dual operation to minimally intersect with the edges of the primary UV graph.

Subsequently, the dual UV engine 122 invokes a flattening engine and a layout engine to create a dual UV set from the dual UV graph. The shape and orientation of the UV pieces in the dual UV set are dependent on the flattening algorithm and the layout algorithm that are implemented. However, since the dual UV set is generated from the dual UV graph, the seams corresponding to the dual UV set minimally intersect with the seams corresponding to the primary UV set. Furthermore, if the primary UV set is linked to one or more textures, then the dual UV engine 122 links the dual UV set to the same textures. Further, if the rendering engine 150 optimally applies texture information derived from both the primary UV set and the dual UV set to the 3D model, then seam artifacts are minimized in the rendered 2D image at all locations except those where the seams overlap (typically single points).

The partial UV engine 124 creates a partial UV set from a primary UV set or from a primary UV set and a corresponding dual UV set. To create the partial UV set from a primary UV set, such as the initial UV set 132, the partial UV engine 124 first determines the primary UV graph. The partial UV engine 124 then generates a partial UV graph that includes non-contiguous patches (e.g., elongated rectangles or ellipses) that, together, cover the edges in the primary UV graph. The partial UV graph may cover only selected portions of the surface of the 3D model. Subsequently, the partial UV engine 124 invokes a flattening engine and a layout engine to create a partial UV set from the partial UV graph. Since the partial UV graph only covers localized portions of the 3D model, only these localized portions of the 3D model are mapped to texture space to create the partial UV set. Furthermore, if the primary UV set is linked to one or more textures, then the partial UV engine 124 links the partial UV set to the appropriate textures. Finally, if the rendering engine 150 optimally applies texture information derived from both the primary UV set and the partial UV set, then seam artifacts are minimized in the rendered 2D image. In contrast, to create a partial UV set from a primary UV set and a corresponding dual UV set, the partial UV engine 124 may generate a partial UV graph that includes non-contiguous patches that, together, cover the intersections of the edges in the primary UV graph with the edges in the dual UV graph.

The overlap UV engine 126 augments a UV set that includes non-overlapping UV pieces. Typically, the unaugmented UV set may be generated using the initial UV set 132. To augment the UV set, the overlap UV engine 122 expands each of the UV pieces in the UV set in every direction that is not constrained by the boundaries of the 3D model. For example, the overlap UV engine 126 expands a UV piece that corresponds to the lower-left corner of a 3D model both upwards and towards the right in object space. Similarly, the overlap UV engine 126 expands a UV piece that corresponds to a portion of the 3D model that is completely surrounded by other geometries in the 3D model in all directions in object space. The overlap UV engine 126 expands each UV piece enough to ensure a minimum overlap of each of the seams corresponding to the unaugmented UV set. Consequently, each point in the 3D model may correspond to anywhere from one to four locations in texture space. More specifically, those points in the 3D model that are within the minimum overlap of the seams corresponding to the unaugmented UV set may be represented by locations in two, three, or four UV pieces in the corresponding augmented UV set. Finally, if the rendering engine 150 optimally applies texture information derived from all of the applicable locations in the augmented UV set, then seam artifacts will be minimized in the rendered 2D image.

As stated, the UV parameterization engine 120 may be configured to read the initial UV set 132, generate zero or more additional UV sets 134, and augment existing UV sets. Accordingly, the UV parameterization engine 120, the painting engine 140, and the graphical user interface 110 include programmed routines or instructions allowing users to create, edit, load, and save the initial UV set 132 and the additional UV sets 134. Similarly, the rendering engine 150 includes programmed routines or instructions that apply the initial UV set 132, the additional UV sets 134, and the augmented UV sets in any combination to the 3D model for rendering and display purposes. Those skilled in the art will recognize, however, that the components shown in FIG. 1 are simplified to highlight aspects of the present invention and that the graphical user interface 110, the UV parameterization engine 120, the painting engine 140, and the rendering engine 150 may include a broad variety of additional tools and features used to compose, manage, and use the initial UV set 132, the additional UV sets 134, and the augmented UV sets.

Figure 2:
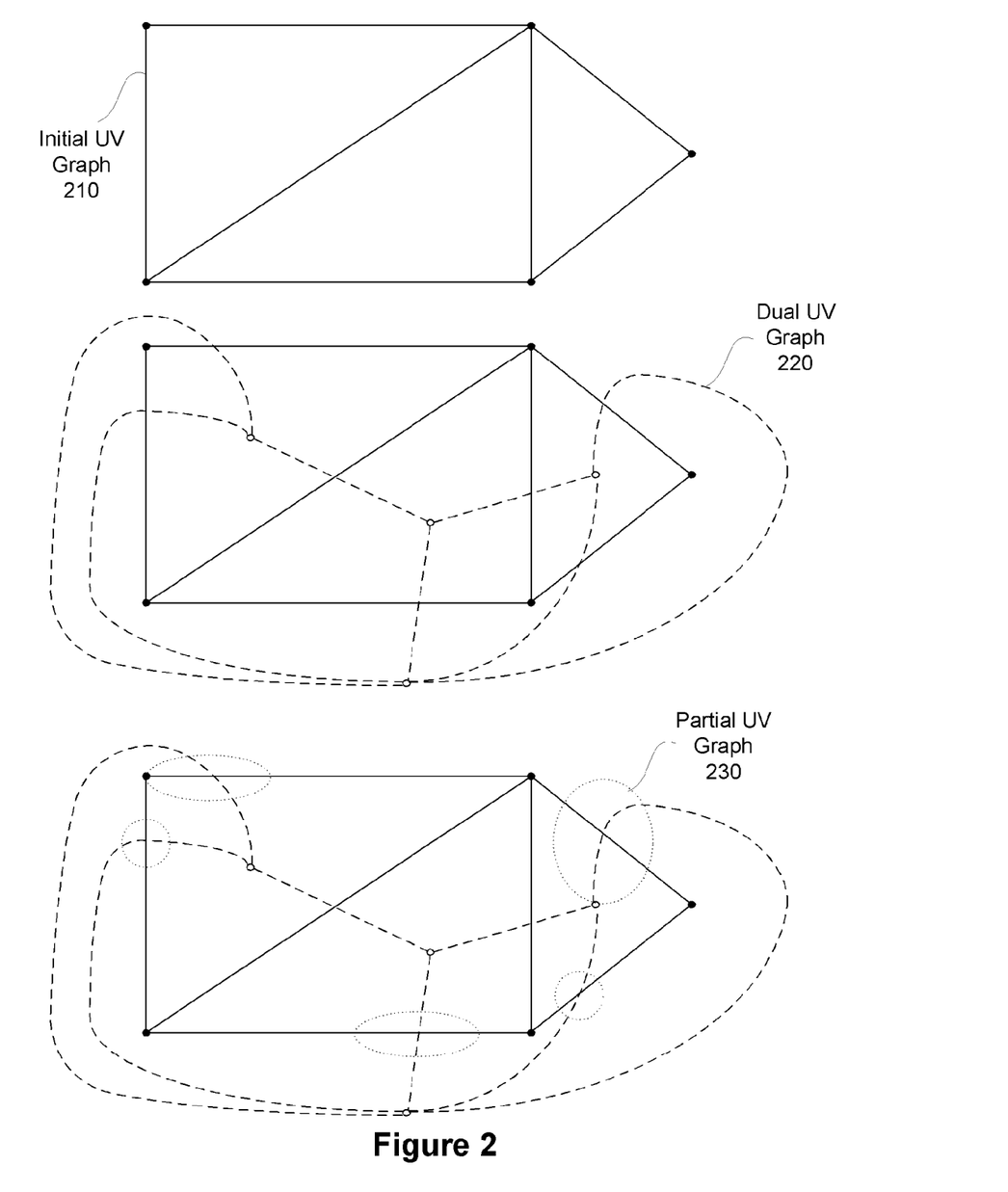
FIG. 2 illustrates an exemplary initial UV graph, a corresponding dual UV graph, and a corresponding partial UV graph, according to one embodiment of the invention.

FIG. 2 illustrates an exemplary initial UV graph 210, a corresponding dual UV graph 220, and a corresponding partial UV graph 230, according to one embodiment of the invention. Although planar views of the graphs 210, 220, and 230 are shown, the graphs 210, 220, and 230 may also be drawn on the surface of the 3D model.

As shown, the initial UV graph 210 includes vertices (depicted by solid dots) and edges (depicted by solid lines) that connect these vertices. The dual UV graph 220 includes different vertices (depicted by hollow dots) and edges (depicted by dashed lines) that connect these vertices. While creating a dual UV set, the dual UV engine 122 generates the initial UV graph 210 from the initial UV set 132. Subsequently, the dual UV engine 122 generates the dual UV graph 220 from the initial UV graph 210 using the dual operation. As shown, the dual UV graph 220 includes a vertex for each region in the initial UV graph 210 and a region for each vertex in the initial UV graph 210. The edges of the initial UV graph 210 intersect minimally with the edges of the dual UV graph 220.

The partial UV graph 230 includes edges (depicted by dotted lines) that connect the vertices. While creating the partial UV set, the partial UV engine 124 may generate the partial UV graph 230 from the initial UV graph 210 and the dual UV graph 220. More specifically, the partial UV engine 124 creates patches (i.e., ellipses) that cover the intersections of the edges in the initial UV graph 210 with the edges of the dual UV graph 220. Together, these patches form the partial UV graph 230. Again, the partial UV graph 230 does not span the entire surface of the 3D model that is represented by the graphs 210, 220, and 230.

Figure 3A:
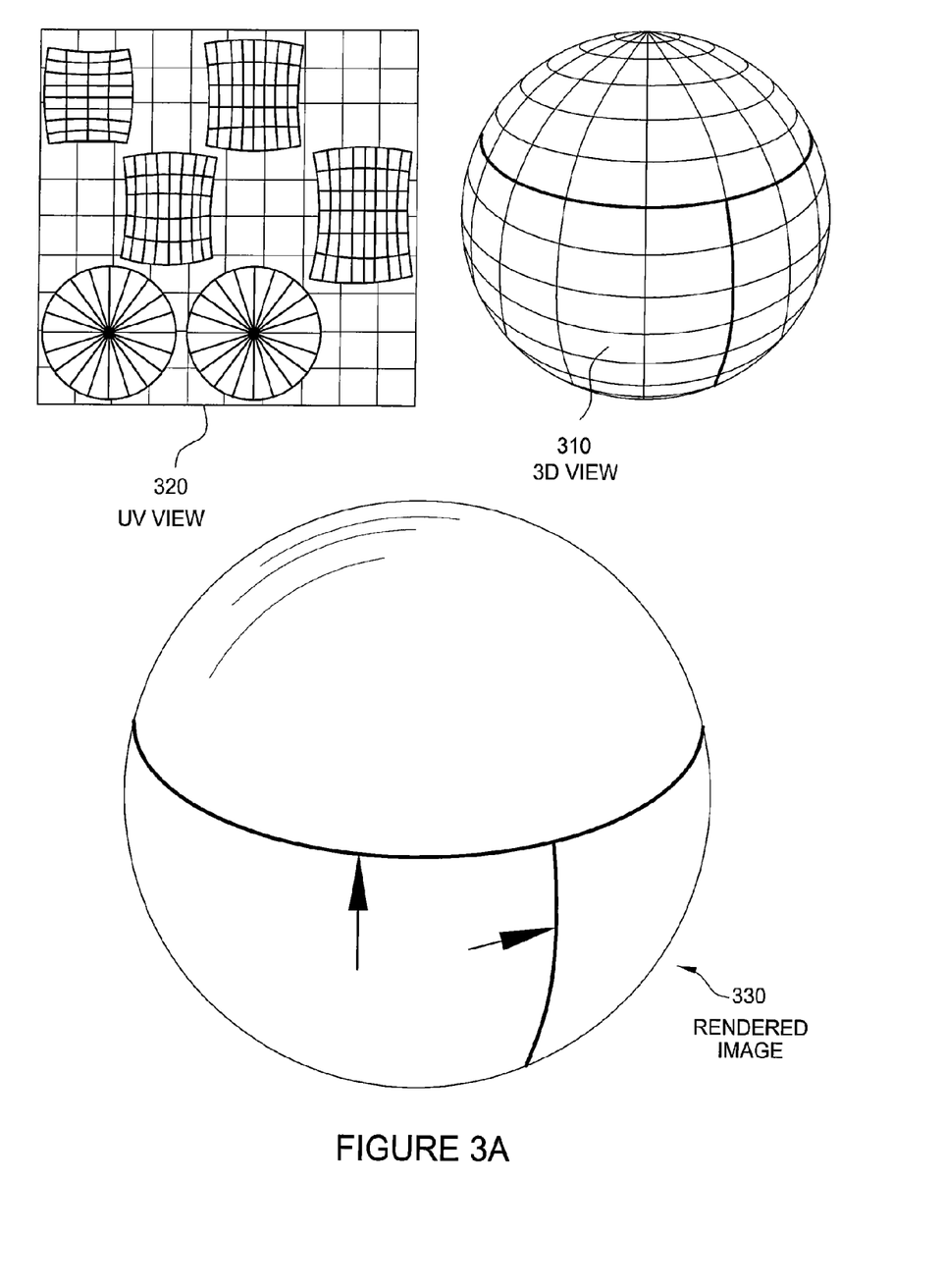
FIG. 3A illustrates an exemplary texture linked to an initial UV set, according to one embodiment of the invention.

FIG. 3A illustrates an exemplary texture linked to an initial UV set, according to one embodiment of the invention. FIG. 3A includes a 3D view 310 of the texture linked to the initial UV set, a UV view 320 of the texture linked to the initial UV set, and a rendered image 330 that the rendering engine 150 generates by applying the initial UV set to the surface of the 3D model. In this example, the UV view 320 shows a flattened 2D representation of the surface of a sphere. Specifically, the UV set shown in the UV view 320 includes two circular UV pieces that fit over the top and bottom of the sphere shown in the 3D view 310, and four generally rectangular pieces that fit around the center of the sphere shown in the 3D view 310. Thick lines 312 in the 3D view 310 show how the edges of the UV pieces in UV view 320 fit on the surface of the sphere. Similarly, arrows 332 in the rendered image 330 highlight seam artifacts created when the UV set shown in UV view 320 is used to render the rendered image 330.

Figure 3B:
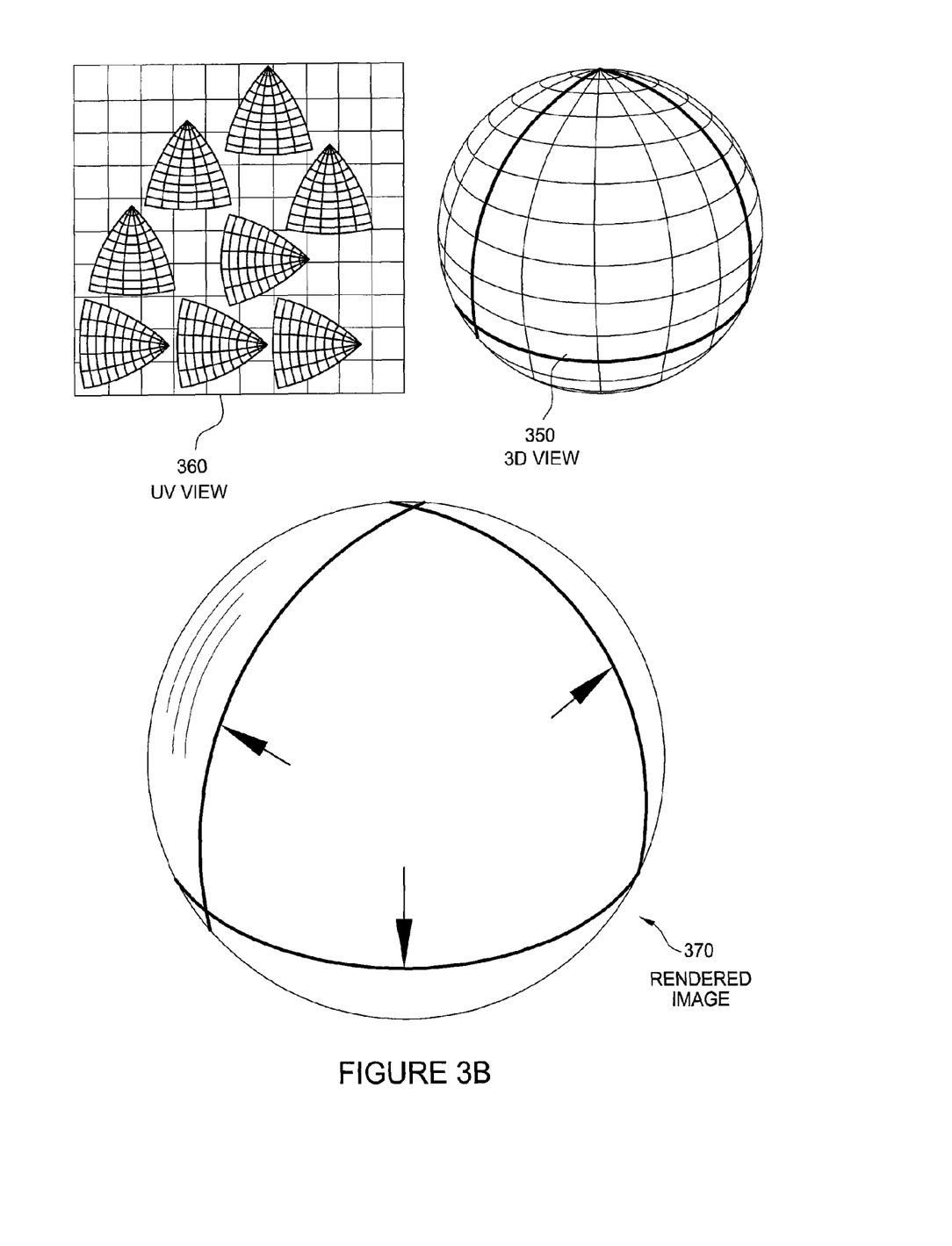
FIG. 3B illustrates the exemplary texture of FIG. 3A linked to a dual UV set, according to one embodiment of the invention.

FIG. 3B illustrates the exemplary texture of FIG. 3A linked to a dual UV set, according to one embodiment of the invention. The dual UV set is the dual of the initial UV set illustrated in FIG. 3A. FIG. 3B includes a 3D view 350 of the texture linked to the dual UV set, a UV view 360 of the texture linked to the dual UV set, and a rendered image 370 that the rendering engine 150 generates by applying the dual UV set to the surface of the 3D model. In this example, the UV set shown in the UV view 360 includes eight generally pie-shaped UV pieces cut from the 3D view 350 and flattened to create the UV set shown in the UV view 360. The thick lines in the 3D view 350 and the edges of the UV pieces in the UV view 360 illustrate the seams corresponding to the dual UV set. The arrows in the rendered image 370 highlight seam artifacts associated with these seams. A comparison of how the UV pieces in UV view 320 and UV view 360 cover the sphere reveal no overlapping seams between the two UV sets.

The texture linked to both the initial UV set illustrated in FIG. 3A and the dual UV set illustrated in FIG. 3B simulates the appearance of a faux-leather surface. The appearance of this texture may be modified using the painting engine 140 of FIG. 1. In one embodiment, the painting engine 140 may be configured to interact simultaneously with the initial UV set 132, the additional UV sets 134, augmented UV sets that includes overlapping UV pieces, or any combination thereof that are linked to the texture that is being accessed. The painting engine 140 may be configured to apply any changes to any affected pieces in linked UV sets. For example, when the user saves the texture illustrated in FIGS. 3A and 3B, the painting engine 140 applies the changes to any affected UV pieces included in the initial UV set and any affected UV pieces included in the dual UV set. Furthermore, the user may modify the texture after the 3D model is rendered to increase the realism of the image when the image is subsequently rendered. As a user paints a 3D model in object space using a brush, the painting engine 140 may fetch texture samples from the appropriate locations within all applicable UV sets to illustrate the results of applying various texture modification techniques beneath the brush. For example, as a user paints the 3D view 310 or the 3D view 350, the painting engine 140 fetches texture samples from both the initial UV set illustrated in FIG. 3A and the dual UV set illustrated in FIG. 3B.

Figure 3C:
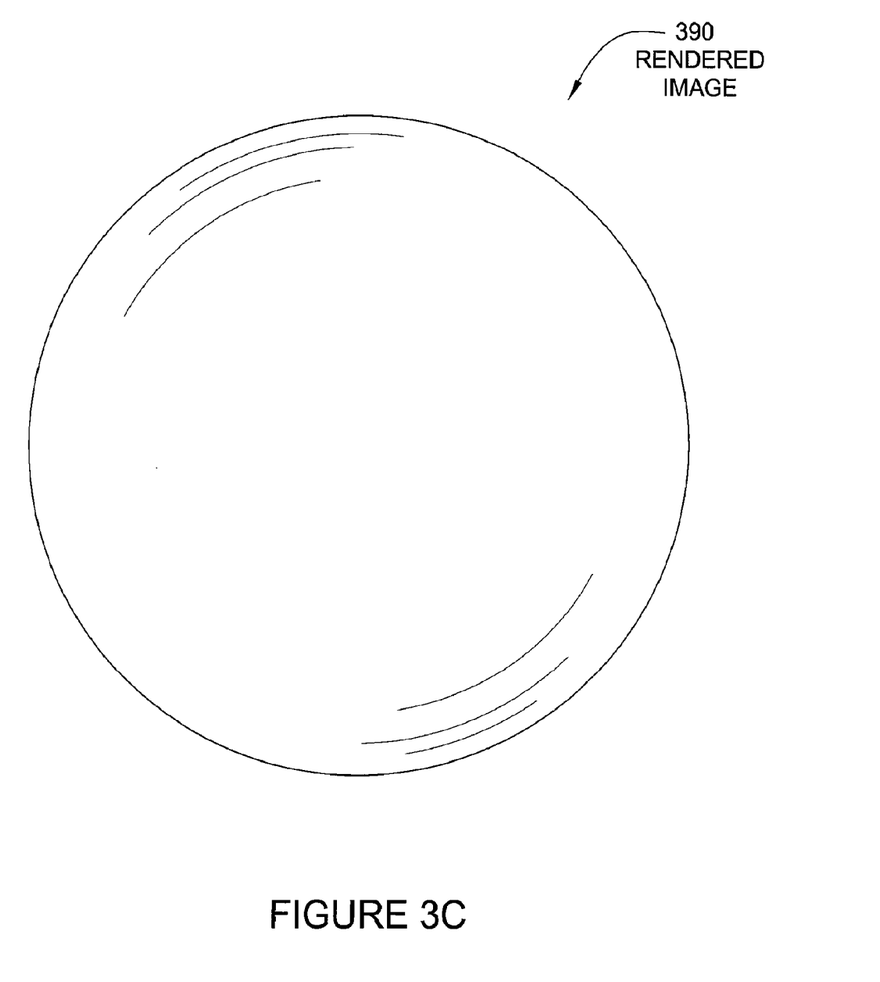
FIG. 3C illustrates an exemplary rendered image, according to one embodiment of the invention.

FIG. 3C illustrates an exemplary rendered image 390, according to one embodiment of the invention. The rendering engine 150 generates the rendered image 390 by applying texture information from both the initial UV set shown in UV view 320 illustrated in FIG. 3A and the corresponding dual UV set shown in UV view 360 illustrated in FIG. 3B. As shown, the rendered image 390 exhibits no visible seam artifacts.

As stated, the rendering engine 150 may include a graphics pipeline 152 and the graphics pipeline 150 includes multiple programmable shaders. In one embodiment, the programmable shaders are configured to apply the initial UV set 132, the additional UV sets 134, augmented UV sets that include UV pieces that overlap in object space, or any combination thereof to each 3D model in the 3D scene to produce a final color for each pixel in the corresponding 2D image. For example, as applicable, the shaders may be configured to fetch texture samples from multiple UV sets and from multiple UV pieces within each of the UV sets. The shaders may be further configured to weight each of these texture samples by the distance of the texture sample from the edges of the associated UV piece. Finally, the shaders may blend and interpolate these weighted texture samples to calculate the final color of each pixel in the rendered image. In this fashion, the shaders color each pixel using texture information that is minimally distorted by seams.

In another embodiment, the UV parameterization engine 120 may be configured to create a transparency map for each additional UV set created from the initial UV set 132. The transparency map may specify full transparency at the edges of each UV piece and may specify gradually decreasing transparency towards the interior of each piece. The shaders may be configured to use the transparency map for each of the additional UV sets to determine the transparency for each texture sample fetched from the additional UV sets and, by extension, the transparency of the texture sample fetched from the initial UV set. That is, when selecting a color for a pixel on the seam of one of the UV sets, the transparency is set to full, leading to no contribution to the color of that pixel from the UV set that includes the seam.

In other embodiments, if the shaders are not configured to process multiple UV sets, then the UV parameterization engine 120 may be configured to render multiple images using different UV sets associated with a 3D model. The UV parameterization engine 120 may then blend these rendered images together to create a final image. For example, the UV parameterization engine may be configured to determine the contribution of each rendered image on a per-pixel basis. For each pixel in the final image, the UV parameterization engine may weight the contribution from the corresponding pixel in each rendered image by the distance from any seam in that rendered image. Similarly, if the shaders are not configured to process augmented UV sets (i.e., UV sets that include UV pieces that overlap in object space), then the UV parameterization engine may be configured to render all the permutations of all the 3D models in the image and all of the UV pieces in the corresponding augmented UV sets. Again, the UV parameterization engine may blend these rendered images together to create a final image.

Figure 4:
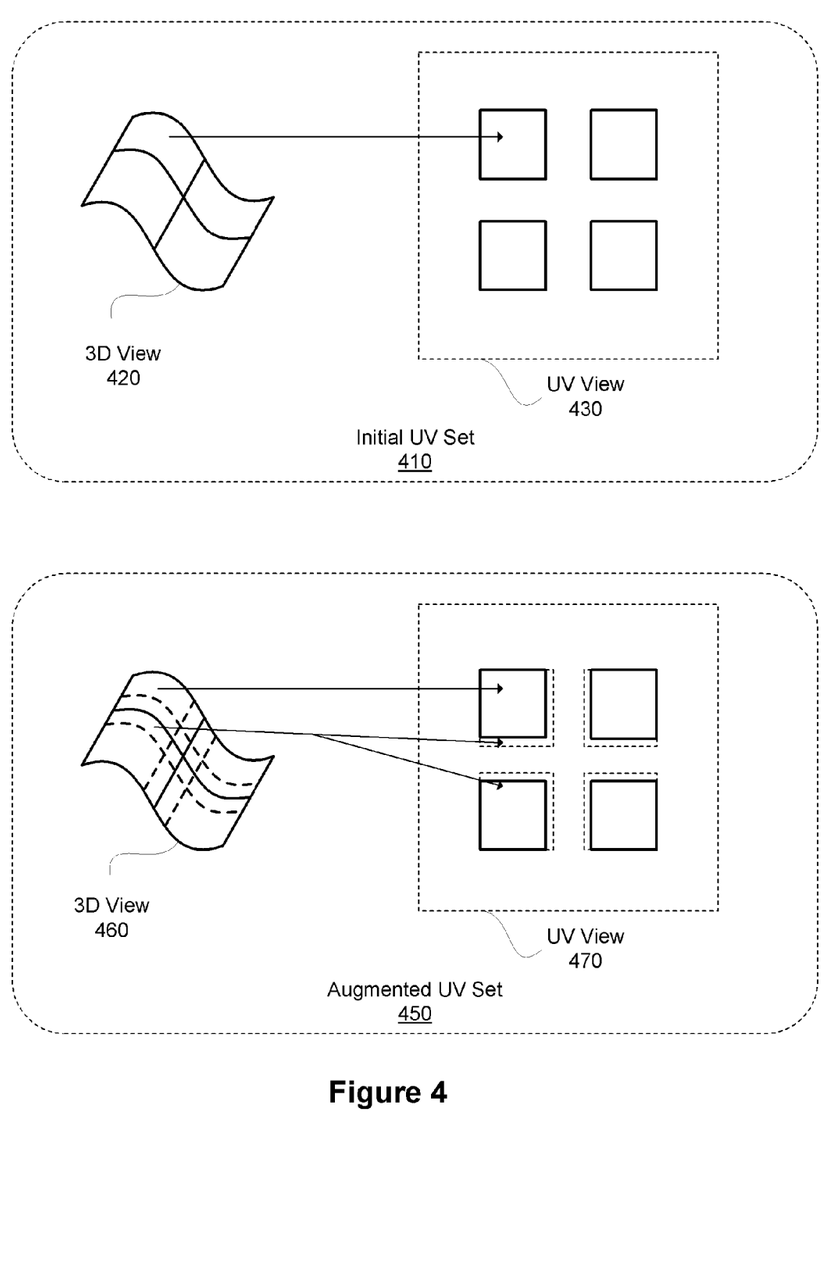
FIG. 4 illustrates an exemplary initial UV set and a corresponding augmented UV set, according to one embodiment of the invention.

FIG. 4 illustrates an exemplary initial UV set 410 and a corresponding augmented UV set 450 according to one embodiment of the invention. As shown, the initial UV set 410 is depicted using both a 3D view 420 and a UV view 430. Similarly, the augmented UV set 450 is depicted using both a 3D view 460 and a UV view 470. The solid lines within the views 420, 430, 460, 470 indicate the seams corresponding to the initial UV set 410. The dashed lines within the views 460, 470 indicate the seams corresponding to the augmented UV set 450.

As shown, the initial UV set 410 includes four UV pieces that do not overlap in either the 3D view 420 or the UV view 430. Each location in the 3D view 420 maps to a single location in the UV view 430. In one embodiment, the overlap UV engine 126 may augment the initial UV set 450, thereby creating the augmented UV set 450, by expanding each of the UV pieces in the initial UV set 410. Illustratively, the four pieces in the augmented UV set 450 overlap in the 3D view 460, but not in the UV view 470. Furthermore, as depicted by the arrows pointing from two locations in the 3D view 460 to the UV view 470, each location in the 3D view 460 maps to one or more locations in the UV view 470.

In alternate embodiments, the overlap UV engine 126 may not be configured to directly expand the UV pieces of a UV set to augment the UV set. Instead, the overlap UV engine 126 may create a UV graph from the UV set. The overlap UV engine 126 may then create an overlap UV graph from the UV graph. This overlap UV graph may define regions that overlap when mapped to the 3D model. The flattening and layout engines may be extended to allow UV pieces to overlap in 3D object space, but ensure that UV pieces do not overlap in 2D texture space. The overlap UV engine 126 may invoke the extended flattening and layout engines, thereby creating an augmented UV set to replace the unaugmented UV set. For example, the augmented UV set 450 may be created from the initial UV set 410 by the overlap UV engine 126 using this methodology.

Figure 5:
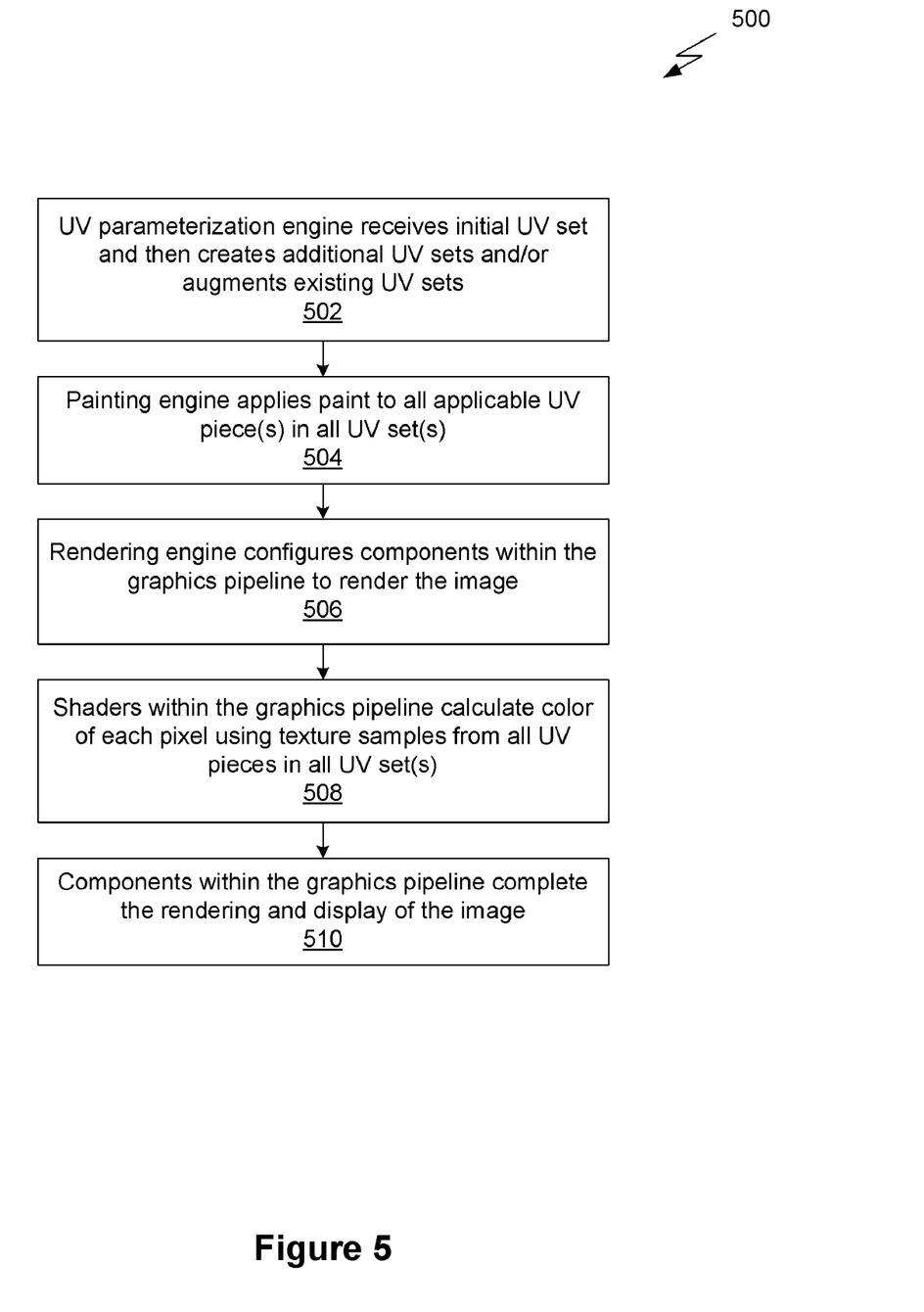
FIG. 5 is a flow diagram of method steps for reducing seam artifacts, according to one embodiment of the invention.

FIG. 5 is a flow diagram of method steps for reducing seam artifacts, according to one embodiment of the invention. Although the method steps are described in conjunction with the system for FIG. 1, persons skilled in the art will understand that any system that performs the method steps, in any order, is within the scope of the invention.

As shown, method 500 begins at step 502 where the UV parameterization engine 120 receives the initial UV set 132, generates zero or more additional UV set(s) 134, and augments zero or more existing UV set(s). For example, as part of step 502, the UV parameterization engine 120 may generate a dual UV set, generate a partial UV set, or augment an existing UV set to include UV pieces that overlap in object space, or any combination thereof. As described above in conjunction with FIG. 1, the one or more UV sets defined at step 502 ensure that seams corresponding to the initial UV set 132 are mapped to the interior of at least one UV piece that is included in the UV set(s). A series of method steps for creating the additional UV sets 134 and augmenting existing UV sets is described in greater detail below in FIG. 6.

At step 504, the painting engine 140 paints the applicable UV piece(s) in the applicable UV set(s) as directed by the user. That is, the painting engine maps the colors of a 3D surface onto the UV pieces of a UV set. Once generated, the UV sets may be used to render an image without the appearance of seam artifacts. For example, at step 506, the rendering engine 150 may configure components of the graphics pipeline 152 to render the image. At step 508, shaders within the graphics pipeline 152 calculate the color of each pixel in the rendered image using texture samples from all the UV pieces in all the UV set(s) that correspond to each object in the image. Again, for each pixel, the shaders are configured to fetch and weight texture samples from multiple UV sets and from multiple UV pieces within each UV set to minimize the impact of seams on the final color. At step 510, components within the graphics pipeline 152 complete the rendering and display of the image.

Figure 6:
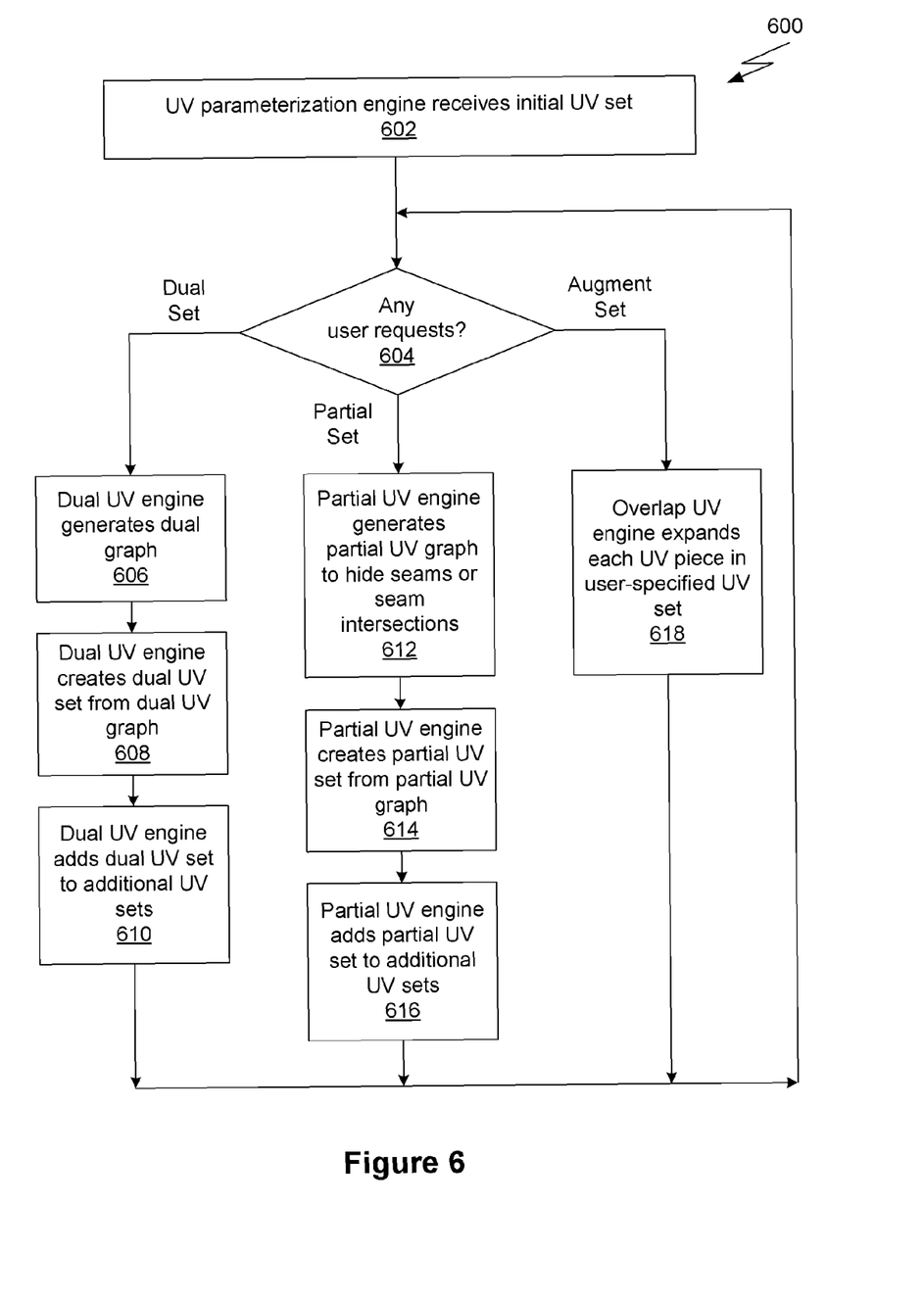
FIG. 6 is a flow diagram of method steps for creating the additional UV sets and augmenting existing UV sets, according to one embodiment of the invention.

FIG. 6 is a flow diagram of method steps for creating additional UV sets 134 and augmenting existing UV sets, according to one embodiment of the invention. Although the method steps are described in conjunction with the system for FIG. 1, persons skilled in the art will understand that any system that performs the method steps, in any order, is within the scope of the invention.

As shown, the method 600 begins at step 602 where the UV parameterization engine 120 receives the initial UV set 132. At step 604, the UV parameterization receives any user requests. At step 604, if the UV parameterization engine 120 receives a user request to generate a dual set from a primary UV set (e.g., the initial UV set 132), then the method 600 proceeds to step 606. At step 606, the dual UV engine 122 generates a graph that is the dual of the UV graph corresponding to the primary UV set. The dual UV engine 122 may generate this dual graph in any technically feasible fashion. At step 608, the dual UV engine 122 invokes flattening and layout tools to create a dual UV set from the dual graph. As part of step 608, if the primary UV set is linked to one or more textures, then the dual UV engine 122 will link the dual UV set to the same textures. Since the dual UV set is generated from the dual UV graph, the seams corresponding to the dual UV set will minimally intersect with the seams corresponding to the primary UV set. At step 610 the dual UV engine 122 adds the dual UV set to the additional UV sets 134, and the method 600 returns to step 604, where the UV parameterization engine 120 receives the next user request.

At step 606, if the UV parameterization engine 120 receives a user request to generate a partial UV set from a primary UV set or a primary UV set and a dual UV set, then the method 600 proceeds to step 612. At step 612, the partial UV engine 124 generates a partial UV graph that is designed to overlap any portion of the seams that are not already overlapped by the interior of a UV piece. More specifically, if the partial UV engine 124 receives only a primary UV set, then the partial UV engine 124 generates a partial UV graph that includes patches that overlap the seams corresponding to the primary UV set. However, if the partial UV engine 124 receives both a primary UV set and a dual UV set, then the partial UV engine 124 generates a partial UV graph that includes patches that overlap the intersection of the seams corresponding to the dual UV set with the seams corresponding to the primary UV set. At step 614, the partial UV engine 124 invokes flattening and layout tools to generate a partial UV set from the partial UV graph. As part of step 614, if the primary UV set is linked to one or more textures, then the partial UV engine 124 will link the partial UV set to the applicable textures. At step 616 the partial UV engine 124 adds the partial UV set to the additional UV sets 134, and the method 600 returns to step 604, where the UV parameterization engine 120 receives the next user request.

At step 606, if the UV parameterization engine 120 receives a user request to augment an existing UV set, then the method 600 proceeds to step 618. At step 618, the overlap UV engine 126 expands each of the UV pieces in the unaugmented UV set enough to overlap the seams corresponding to the unaugmented UV set by at least a specified minimum overlap. Each of the UV pieces may be expanded in multiple directions in a manner that is constrained by the boundaries of the 3D model that is associated with the UV set. Consequently, the expanded UV pieces overlap in object space when used to cover the surface of the 3D model and each point in the 3D model may map to multiple locations in texture space. In other words, any given point in the model may be covered by multiple UV pieces in the UV set. As part of step 618, if the unaugmented UV set is linked to one or more textures, then the overlap UV engine 126 updates the augmented UV set to reflect the linked textures. The method 600 then returns to step 604, where the UV parameterization engine 120 receives the next user request.

The method 600 continues executing various subsets of steps 604-618, receiving and processing user requests to generate dual UV sets, generate partial UV sets, augment existing UV sets, or any combination thereof as long as the UV parameterization engine 120 is running. Again, in alternate embodiments, the user may manually edit any additional UV sets that are generated by the UV parameterization engine, and the UV parameterization engine may be configured to allow the user to register manually-created additional UV sets.

In sum, embodiments of the present invention provide techniques for reducing seam artifacts in rendered images. Components within a UV parameterization engine generate one or more additional UV sets (e.g. a dual UV set or a partial UV set) from an initial UV set. Alternatively, a UV parameterization engine may augment an existing UV set. The user configures a UV parameterization engine using an initial UV set that covers the surface of a 3D model. The user may specify a set of options for creating either additional UV parameterizations or an augmented UV set.

In one embodiment, the dual UV engine is configured to generate the dual graph of the graph defined by the initial UV set and, subsequently, generate a dual UV set from the dual graph using flattening and layout tools. The seams corresponding to the dual UV set minimally intersect the seams corresponding to the initial UV set. Further, a partial UV engine may generate a partial UV set to cover the intersections of the seams corresponding to the initial UV set and the dual UV set. In another embodiment, the parameterization engine does not invoke the dual UV engine and the partial UV engine is configured to generate a partial UV set that covers the seams corresponding to the initial UV set. In other embodiments, the parameterization engine does not invoke either the dual UV engine or the partial UV engine and an overlap UV engine may be configured to augment the initial UV set. For each UV piece in the unaugmented initial UV set, the overlap UV engine creates a larger UV piece that spans an extended area of the 3D model, thereby creating an augmented UV set that includes UV pieces that overlap in object space.

If textures are linked to the initial UV set, then components within the UV parameterization engine links these textures to any additional UV sets that the components generate. Further, the overlap UV engine 126 updates any augmented UV sets to reflect the linked textures. While manipulating textures, the painting engine is configured to interact with multiple UV sets and augmented UV sets—applying changes to one or more UV pieces in one or more UV sets as appropriate. During rendering, shaders running in a graphics rendering pipeline may blend and interpolate contributions from all of the UV pieces in all of the UV sets to determine a single color for each pixel. In a particular embodiment, the shaders are configured to weight each of the texture samples by the distance of the texture sample from any seams. Advantageously, using the initial UV set, additional UV sets, augmented UV sets, or any combination thereof enables the shaders to access texture data that is less distorted by seams than in prior-art approaches, thereby reducing seam artifacts in the rendered image. Furthermore, these UV sets do not increase any interference between unconnected pieces of the object. Finally, since each texel in these UV sets maps to an area within the boundaries of the 3D model, the value corresponding to each texel in the UV sets is well defined.

While the foregoing is directed to embodiments of the present invention, other and further embodiments of the invention may be devised without departing from the basic scope thereof, and the scope thereof is determined by the claims that follow.

What is claimed is:

1. A computer-implemented method for reducing seams in an image of a three-dimensional (3D) model rendered using a texture, the method comprising:
   receiving a first UV set associated with the 3D model via a processor, wherein the first UV set includes one or more UV pieces defining a first two-dimensional (2D) representation of the 3D model;
   defining at least a second UV set based on the first UV set via the processor, wherein the second UV set includes one or more UV pieces defining a second 2D representation of the 3D model, and wherein seams corresponding to the first UV set are mapped to an interior of at least one UV pieces that is included in the second UV set when applied to the 3D model; and
   applying the first UV set and the second UV set to the 3D model during a rendering operation to generate a rendered 2D image of the 3D model.

2. The method of claim 1, wherein the step of defining the at least the second UV set comprises automatically computing the at least the second UV set.

3. The method of claim 2, wherein the step of automatically computing the at least the second UV set comprises:
   computing a first graph representation of the first UV set;
   computing a dual graph representation of the first graph representation of the first UV set, wherein one or more edges of the dual graph representation intersect edges of the first graph representation of the first UV set; and computing the second UV set from the dual graph representation.

4. The method of claim 3, further comprising generating a third UV set that includes a UV piece covering each region of the 3D model, wherein a seam of the first UV set and the second UV set intersect with one another when applied to the 3D model.

5. The method of claim 3, wherein each vertex included in the dual graph representation corresponds to a region in the first UV graph representation, and each region included in the dual graph representation corresponds to a vertex in the first graph representation.

6. The method of claim 2, wherein the step of automatically computing the at least the second UV set comprises computing a partial UV set based on the first UV set that set includes a set of non-contiguous regions, wherein each region covers a seam created when the first UV set is applied to the 3D model.

7. The method of claim 1, wherein the step of defining the at least the second UV set comprises registering a manually-defined UV set.

8. The method of claim 1, wherein the step of applying the first UV set and the second UV set to the 3D model further comprises:
applying the first UV set to a first copy of the 3D model to generate a first rendered image;
applying the second UV set to a second copy of the 3D model to generate a second rendered image; and
generating a third image by blending corresponding pixel color values from the first rendered image and the second rendered image.

9. The method of claim 1, wherein the step of applying the first UV set and the second UV set to the 3D model comprises:
fetching texture samples from the first UV set and the second UV set;
computing a distance of the texture samples from a texture seam of the respective the first UV set and the second UV set; and
weighting a contribution of the texture samples to determine a color value of a pixel in the rendered 2D image of the 3D model based on the distance.

10. The method of claim 2, further comprising receiving and applying manual edits to one or more of the at least the second UV set.

11. The method of claim 1, further comprising the steps of:
computing a first minimum distance of a rectangular array of pixels from a texture seam of the first UV set;
computing a second minimum distance of the rectangular array of pixels from a texture seam of the second UV set;
fetching texture samples from one of the first UV set or the second UV set based on comparing the first minimum distance and the second minimum distance; and
executing a painting operation on the rectangular array of pixels based on the texture samples.

12. The method of claim 11, wherein the step of executing the painting operation comprises executing one of a blurring operation and a smearing operation.

13. A non-transitory computer-readable storage medium storing instructions that when executed by a processor cause the processor to perform a method for reducing seams in an image of a three-dimensional (3D) model rendered using a texture by performing the steps of:
receiving a first UV set associated with the 3D model, wherein the first UV set includes one or more UV pieces defining a first two-dimensional (2D) representation of the 3D model;
defining at least a second UV set based on the first UV set, wherein the second UV set includes one or more UV pieces defining a second 2D representation of the 3D model, and wherein seams corresponding to the first UV set are mapped to an interior of at least one UV pieces that is included in the second UV set when applied to the 3D model; and
applying the first UV set and the second UV set to the 3D model during a rendering operation to generate a rendered 2D image of the 3D model.

14. The non-transitory computer-readable storage medium of claim 13, wherein the step of defining the at least the second UV set comprises automatically computing the at least the second UV set.

15. The non-transitory computer-readable storage medium of claim 14, wherein the step of automatically computing the at least the second UV set comprises:
computing a first graph representation of the first UV set;
computing a dual graph representation of the first graph representation of the first UV set, wherein one or more edges of the dual graph representation intersect edges of the first graph representation of the first UV set; and
computing the second UV set from the dual graph representation.

16. The non-transitory computer-readable storage medium of claim 15, wherein the steps further comprise generating a third UV set that includes a UV piece covering each region of the 3D model, wherein a seam of the first UV set and the second UV set intersect with one another when applied to the 3D model.

17. The non-transitory computer-readable storage medium of claim 15, wherein each vertex included in the dual graph representation corresponds to a region in the first UV graph representation, and each region included in the dual graph representation corresponds to a vertex in the first graph representation.

18. The non-transitory computer-readable storage medium of claim 14, wherein the step of automatically computing the at least the second UV set comprises computing a partial UV set based on the first UV set that includes a set of non-contiguous regions, wherein each region covers a seam created when the first UV set is applied to the 3D model.

19. The non-transitory computer-readable storage medium of claim 13, wherein the step of defining the at least the second UV set comprises registering a manually-defined UV set.

20. The non-transitory computer-readable storage medium of claim 13, wherein the step of applying the first UV set and the second UV set to the 3D model further comprises:
applying the first UV set to a first copy of the 3D model to generate a first rendered image;
applying the second UV set to a second copy of the 3D model to generate a second rendered image; and
generating a third image by blending corresponding pixel color values from the first rendered image and the second rendered image.

21. The non-transitory computer-readable storage medium of claim 13, wherein the step of applying the first UV set and the second UV set to the 3D model comprises:
fetching texture samples from the first UV set and the second UV set;
computing a distance of the texture samples from a texture seam of the respective the first UV set and the second UV set; and
weighting a contribution of the texture samples to determine a color value of a pixel in the rendered 2D image of the 3D model based on the distance.

22. The non-transitory computer-readable storage medium of claim 14, wherein the steps further comprise, receiving and applying manual edits to one or more of the at least the second UV set.

23. The non-transitory computer-readable storage medium of claim 13, wherein the steps further comprise:
   computing a first minimum distance of a rectangular array of pixels from a texture seam of the first UV set;
   computing a second minimum distance of the rectangular array of pixels from a texture seam of the second UV set;
   fetching texture samples from one of the first UV set or the second UV set based on comparing the first minimum distance and the second minimum distance; and
   executing a painting operation on the rectangular array of pixels based on the texture samples.

24. The non-transitory computer-readable storage medium of claim 23, wherein the step of executing the painting operation comprises executing one of a blurring operation and a smearing operation.

25. A computer-implemented method for reducing seams in an image of a three-dimensional (3D) model rendered using a texture, the method comprising:
   identifying a first UV set associated with the 3D model, wherein the first UV set includes one or more UV pieces defining a first two-dimensional (2D) flattened representation of the 3D model; and
   invoking a parameterization engine, wherein the parameterization engine is configured to:
      receive the first UV set, and
      define at least a second UV set based on the first UV set, wherein the at least second UV set includes one or more UV pieces defining a second 2D flattened representation of the 3D model, and wherein seams corresponding to the first UV set are mapped to an interior of at least one UV pieces that is included in the second UV set when applied to the 3D model; and
   invoking a rendering engine, which when rendering an image of the 3D model, is configured to apply the first UV set and the second UV set to the 3D model during a rendering operation to generate a rendered 2D image of the 3D model.

26. The method of claim 25, wherein the parameterization engine is configured to automatically compute the at least the second UV set by performing the steps of:
   computing a first graph representation of the first UV set;
   computing a dual graph representation of the first graph representation of the first UV set, wherein the edges of the dual graph representation minimally intersect the edges of the first graph representation of the first UV set; and
   computing the second UV set from the dual graph representation.

27. The method of claim 26, wherein the parameterization engine is further configured to generate a third UV set that includes a UV piece covering each region of the 3D model, wherein a seam of the first UV set and the second UV set intersect with one another when applied to the 3D model.

28. The method of claim 26, wherein each vertex included in the dual graph representation corresponds to a region in the first UV graph representation, and each region included in the dual graph representation corresponds to a vertex in the first graph representation.

29. The method of claim 25, wherein the parameterization engine is configured to automatically compute the at least the second UV set by computing a partial UV set based on the first UV set that includes a set of non-contiguous regions, wherein each region covers a seam created when the first UV set is applied to the 3D model.

30. The method of claim 25, wherein the step of defining the at least a second UV set comprises registering a manually-defined UV set.

31. The method of claim 25, wherein the rendering engine is configured to apply the first UV set and the second UV set to the 3D model to generate a rendered 2D image of the 3D model by performing the steps of:
   applying the first UV set to a first copy of the 3D model to generate a first rendered image;
   applying the second UV set to a second copy of the 3D model to generate a second rendered image; and
   generating a third image by blending corresponding pixel color values from the first rendered image and the second rendered image.

32. The method of claim 25, wherein the rendering engine is configured to apply the first UV set and the second UV set to the 3D model to generate a rendered 2D image of the 3D model by performing the steps of:
   fetching texture samples from the first UV set and the second UV set;
   computing a distance of the texture samples from a texture seam of the respective the first UV set and the second UV set; and
   weighting a contribution of the texture samples to determine a color value of a pixel in the rendered 2D image of the 3D model based on the distance.

33. The method of claim 25, wherein the parameterization engine is further configured to receive and apply manual edits to one or more of the at least the second UV set.

34. The method of claim 25, further comprising:
   invoking a painting engine, wherein the painting engine is configured to:
      compute a first minimum distance of a rectangular array of pixels from a texture seam of the first UV set,
      compute a second minimum distance of the rectangular array of pixels from a texture seam of the second UV set,
      fetch texture samples from one of the first UV set or the second UV set based on comparing the first minimum distance and the second minimum distance, and
      execute a painting operation on the rectangular array of pixels based on the texture samples.

35. The method of claim 34, wherein the painting engine is further configured to execute the painting operation by executing one of a blurring operation and a smearing operation.

* * * * *